United States Patent
Francis et al.

(10) Patent No.: US 7,934,730 B2
(45) Date of Patent: May 3, 2011

(54) HAND TRUCK ASSEMBLY

(75) Inventors: Noel Francis, Skokie, IL (US); Dan Williams, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 12/339,893

(22) Filed: Dec. 19, 2008

(65) Prior Publication Data

US 2009/0160148 A1    Jun. 25, 2009

Related U.S. Application Data

(60) Provisional application No. 61/008,327, filed on Dec. 19, 2007.

(51) Int. Cl.
*B62B 1/04* (2006.01)

(52) U.S. Cl. ............... 280/47.29; 280/47.28; 280/47.18; 414/490

(58) Field of Classification Search ............... 280/47.17, 280/47.18, 47.23, 47.24, 47.27–47.29; 414/490
See application file for complete search history.

(56) References Cited

U.S. PATENT DOCUMENTS

| | | | |
|---|---|---|---|
| 2,784,004 A | 3/1957 | Hamrick, Jr. | |
| 3,193,123 A | 7/1965 | Wouden | |
| 4,921,270 A * | 5/1990 | Schoberg | ................... 280/655.1 |
| 4,974,862 A | 12/1990 | Maupin | |
| 5,290,051 A | 3/1994 | Olson | |
| 5,474,313 A | 12/1995 | Marquardt | |
| 5,577,745 A | 11/1996 | Birk | |
| D449,144 S | 10/2001 | Measom | |
| D454,997 S | 3/2002 | Matre et al. | |
| D465,634 S | 11/2002 | Botzau et al. | |
| D481,512 S | 10/2003 | Lee | |
| 6,709,222 B2 | 3/2004 | Inman, Jr. | |
| 6,851,685 B2 | 2/2005 | Koenig | |
| 7,004,482 B1 * | 2/2006 | Steffan | ....................... 280/47.17 |

* cited by examiner

*Primary Examiner* — Jeffrey J Restifo
*Assistant Examiner* — Erez Gurari
(74) *Attorney, Agent, or Firm* — Maginot, Moore & Beck

(57) ABSTRACT

A hand truck assembly includes a frame including an upper portion and a lower portion. The assembly further includes a handle attached to the upper portion of the frame. The assembly also includes a pair of wheels attached to the lower portion of the frame. In addition, the assembly includes a fixed work support member attached in fixed relation to the lower portion of the frame. The assembly further includes a movable work support member attached to the lower portion of the frame, the movable work support member being moveable between (i) a first position in which a free end portion of the movable work support member rests on the fixed work support member, and (ii) a second position in which the free end portion of the movable work support member is spaced apart from the fixed work support member. The assembly also includes a post attached in fixed relation to the free end portion of the movable work support member. The assembly additionally includes a power tool such as a hammer jack that defines a cavity. When the movable work support member is positioned in the first position, (i) the post is located within the cavity of the power tool, and (ii) the power tool is supported on the movable work support member.

20 Claims, 7 Drawing Sheets

HAND TRUCK ASSEMBLY

This application claims the benefit of U.S. Provisional Application Ser. No. 61/008,327, filed Dec. 19, 2007.

FIELD

This application relates to the field of hand trucks, also referred to as hand carts or dollies.

BACKGROUND

Two wheeled hand trucks are widely used for moving heavy articles. The basic hand truck comprises an upright frame, a handle and two wheels. A flat base plate or work support member is provided at the lower portion of the frame for sliding under an article to be moved. When the user pivots the handle toward himself or herself, the base plate pivots upward and the frame is supported entirely by the wheels. An article resting on the base plate may then be wheeled from one location to another.

Various versions and adaptations of the basic hand truck exist to provide additional functionality in certain situations. For example, in some embodiments, the hand truck is convertible from an upright two wheeled hand truck to a horizontal four wheeled hand cart. In other embodiments, the basic hand truck includes horizontally extending arms or forks that help in securing large items on the hand truck.

While various adaptations of the basic hand truck have been made, these various adaptations are not useful in all situations. It would be desirable if a hand truck could be further modified such that certain types of machines or other apparatus could be situated more securely on the hand truck. For example, hammer drills are often moved using a hand truck, but present embodiments of the hand truck do not seem particularly well suited to moving hammer drills. Accordingly, it would be desirable to provide a hand truck that facilitates easy movement of a hammer drill. It would also be desirable if this same hand truck could be used to move other machinery or apparatus in addition to hand trucks. Furthermore, it would be desirable if elements used to facilitate movement of a hammer drill could be easily added to the hand truck with minimal additional expense or adaptations to the basic structure of the hand truck.

While it would be desirable to provide a hand truck that provides one or more of the foregoing or other advantageous features as may be apparent to those reviewing this disclosure, the teachings disclosed herein extend to those embodiments which fall within the scope of the claims, regardless of whether they provide one or more of the above-mentioned advantages.

SUMMARY

A hand truck is disclosed herein. The hand truck comprises a frame including an upper portion and a lower portion. A handle is provided on the upper portion of the frame. At least one wheel is connected to the lower portion of the frame. A first foot extends outward from the lower portion of the frame. A second foot is provided on the lower portion of the frame. The second foot is moveable between an extended position where the second foot extends substantially over the first foot and a retracted position where the second foot does not extend substantially over the first foot. In addition, an elongated mounting member is positioned on the second foot, the elongated mounting member is provided in an upright orientation when the first foot is in the extended position.

In at least one embodiment of the hand truck, the first foot is a base plate and the second foot is a moveable plate. Furthermore, in at least one embodiment of the hand truck, the moveable plate is a pivotable plate and the elongated mounting member is a post oriented substantially perpendicular to the moveable plate. The hand truck may further comprise a clip provided on the frame. In this embodiment, the elongated mounting member engages the clip when the second foot is in the retracted position.

In at least one embodiment a hand truck comprises a frame including an upper portion and a lower portion. A base plate is provided on the frame and extends outward from the lower portion of the frame. A moveable plate is also provided on the lower portion of the frame. The moveable plate is moveable between a first position where the moveable plate contacts the base plate and a second position where the moveable plate is removed from the base plate. A mounting post is provided on the pivotable plate. A central axis defined by the mounting post is oriented substantially perpendicular to a plane defined by the pivotable plate.

In at least one embodiment, a hand truck comprises a base plate fixed to the frame and a pivotable member movably attached to the frame. A mounting post is attached to the pivotable member. The pivotable member is moveable between a first position where the mounting post is oriented substantially perpendicular to the base plate and a second position wherein the mounting post is oriented substantially parallel to the base plate.

According to another embodiment, a hand truck assembly includes a frame including an upper portion and a lower portion. The assembly further includes a handle attached to the upper portion of the frame. The assembly also includes at least one wheel attached to the lower portion of the frame. In addition, the assembly includes a fixed work support member attached in fixed relation to the lower portion of the frame. The assembly further includes a movable work support member attached to the lower portion of the frame, the movable work support member being moveable between (i) a first position in which a free end portion of the movable work support member rests on the fixed work support member, and (ii) a second position in which the free end portion of the movable work support member is spaced apart from the fixed work support member. The assembly also includes a post attached in fixed relation to the free end portion of the movable work support member.

In accordance with yet another embodiment, a hand truck assembly includes a frame including an upper portion and a lower portion. The assembly further includes a pair of wheels supported by the frame. The assembly also includes a fixed work support member attached in fixed relation to the lower portion of the frame. In addition, the assembly includes a movable work support member attached to the lower portion of the frame, the movable work support member being moveable between (i) a first position in which a free end portion of the movable work support member contacts the fixed work support member, and (ii) a second position in which the free end portion of the movable work support member is spaced apart from the fixed work support member. Additionally, the assembly includes a mounting member attached in fixed relation to the free end portion of the movable work support member.

The above described features and advantages, as well as others, will become more readily apparent to those of ordinary skill in the art by reference to the following detailed description and accompanying drawings.

DESCRIPTION

Figure 1:
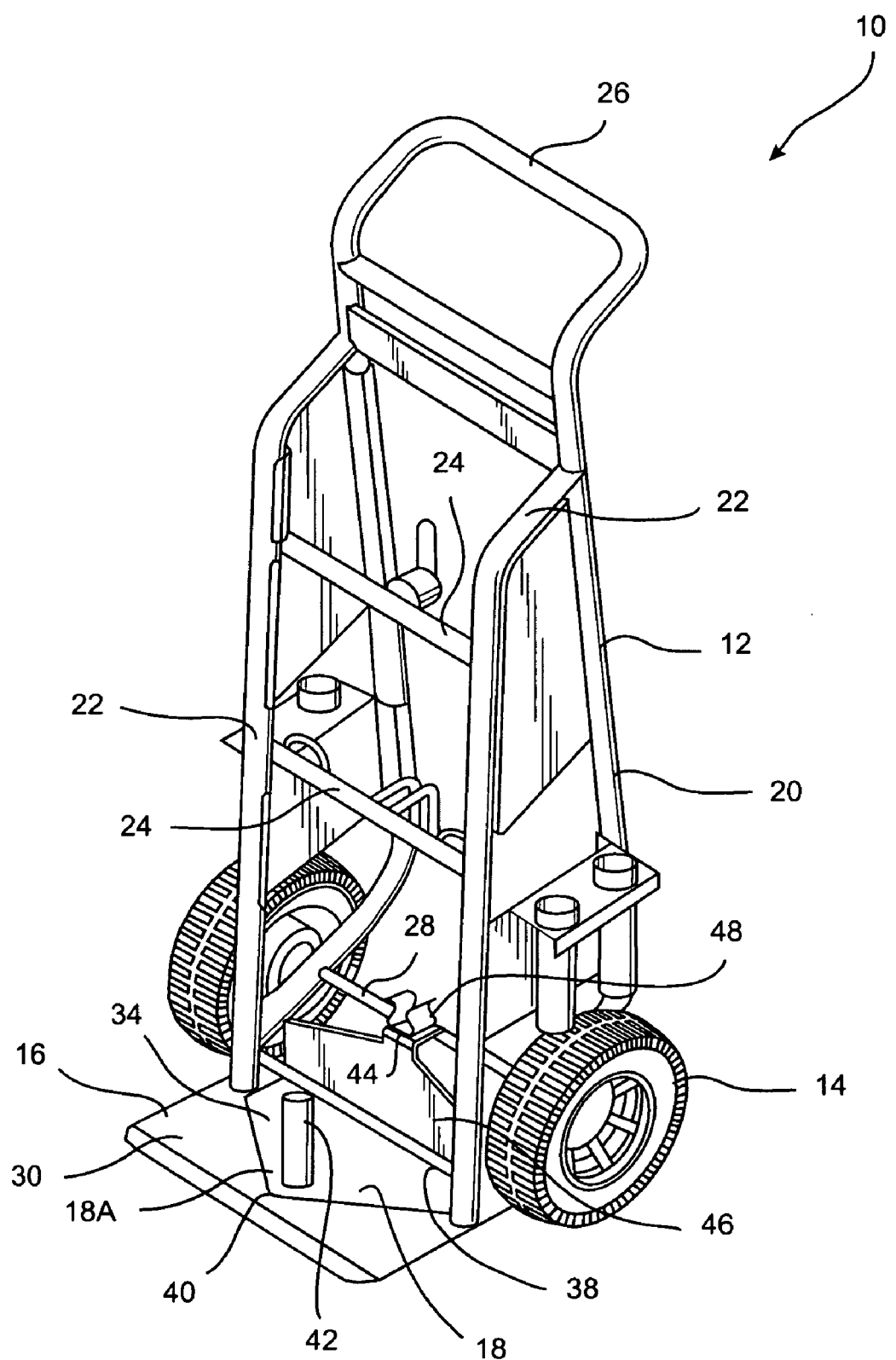
FIG. 1 shows a perspective view of one embodiment of a hand truck with a retractable mounting plate.
Figure 2:
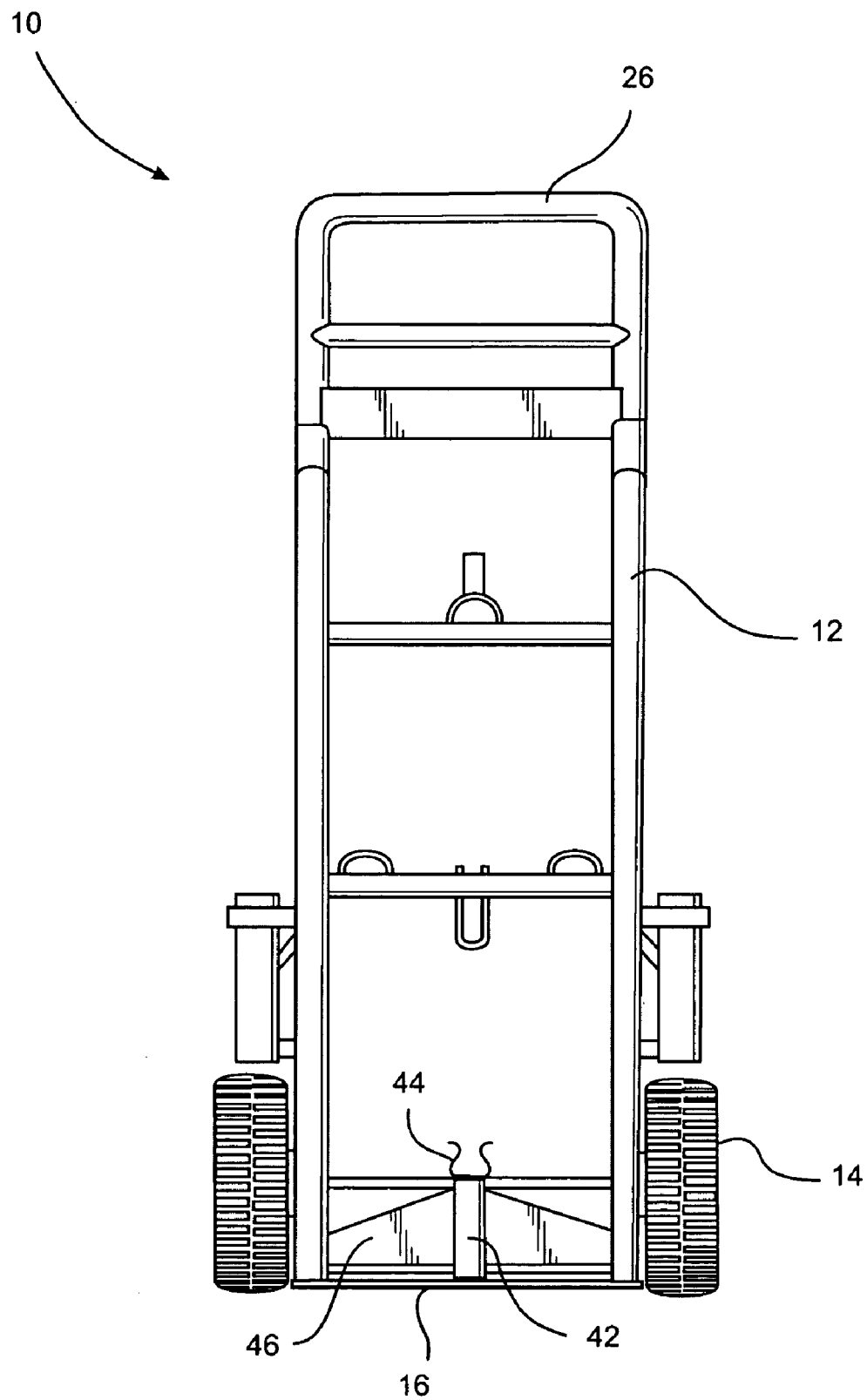
FIG. 2 shows a front view of the hand truck of FIG. 1.
Figure 3:
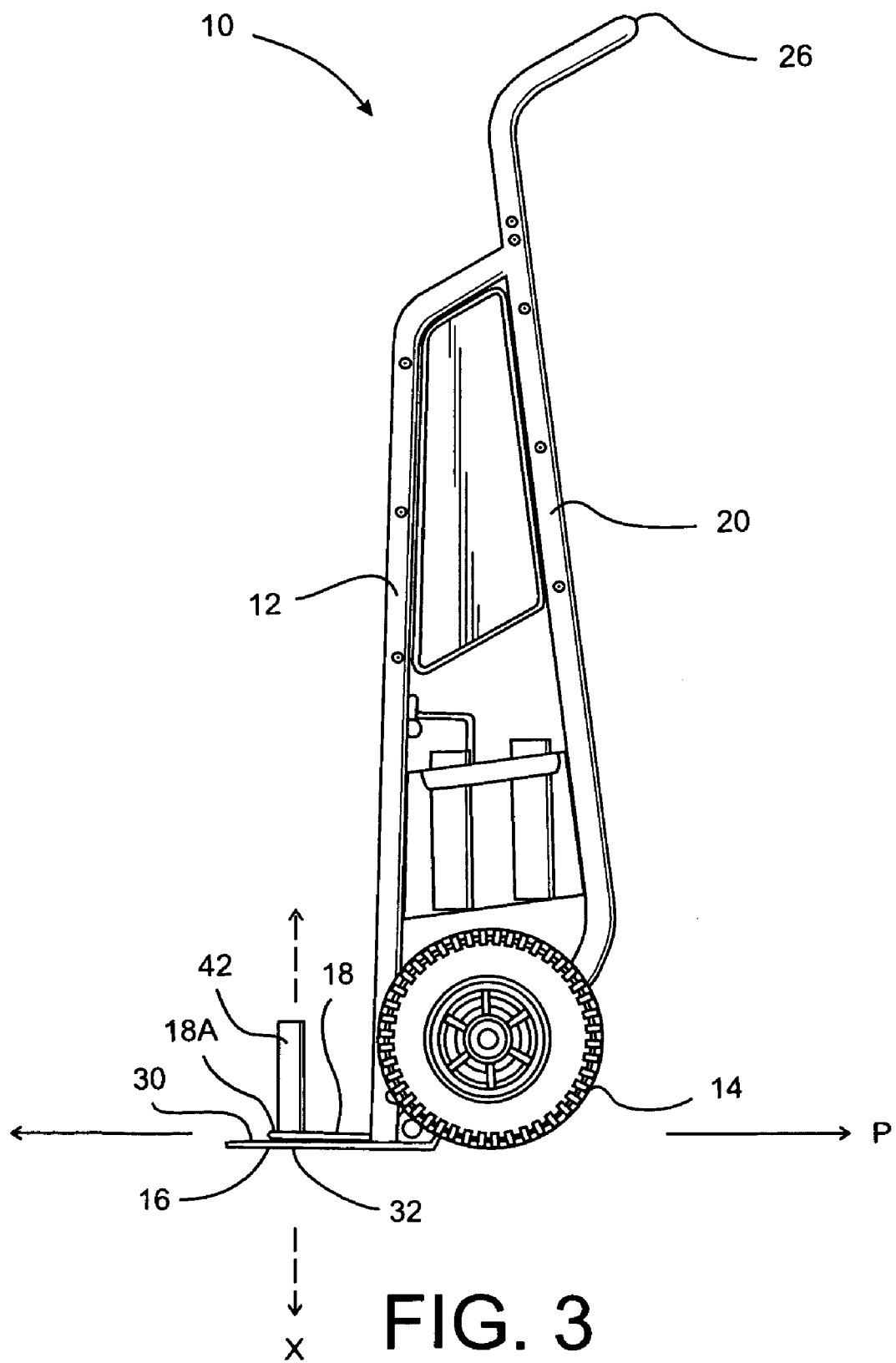
FIG. 3 shows a side view of the hand truck of FIG. 1 with the mounting plate in an extended position.

With reference to FIGS. 1-3, a hand truck 10 (also referred to herein as a hand cart) includes an upright frame 12, two wheels 14, a fixed work support member or base plate 16 and a movable work support member or pivotable mounting plate 18. The pivotable mounting plate 18 includes a free end portion 18A.

The frame 12 is comprised of a plurality of tube-like structures, such as metal tubes, which are joined together to assemble the frame 12. The tube-like structures include a main rear tube 20, two forward side tubes 22, and a plurality of horizontal support tubes 24. The tubes 20, 22, 24 are all connected together to form a generally trapezoidal frame with a rear handle 26. The rear handle 26 is positioned on the upper rear portion of the cart 10, and is provided by a U-shaped end of the main tube 20.

The two wheels 14 are positioned on an axle 28 that is supported by the frame at a lower portion of the frame. For example, the axle 28 may be inserted through holes in the lower portion of the main tube 20. The wheels 14 are positioned on the frame such that when the cart 10 is tipped to the rear by the handle 26 the frame 12 is wholly supported by the wheels 14. By contrast, when the cart 10 is in the upright position, the frame 12 is supported by the wheels 14 and the base plate 16, allowing the cart 10 to stand alone without being held in the upright position.

The base plate 16 in the disclosed embodiment is a substantially flat member that extends outward from the front of the frame 12 between the two side tubes 22. The base plate 16 includes an upper surface 30 positioned to contact an item being moved by the cart 10 and a lower surface 32 positioned to contact the ground when the cart 10 is in the upright position. In at least one embodiment, the base plate 16 is generally rectangular in shape as is common for truck cart base plates. The base plate 16 provides a foot member for the cart 10 which projects outward from the lower portion of the frame 12.

The mounting plate 18 is pivotably mounted to the frame 12 between the two side tubes 22 at the lower portion of the frame 12. In the disclosed embodiment, the mounting plate 18 is generally flat and triangular in shape with an elongated pivoting side 38 and the two additional sides meeting at an apex 40. The elongated pivoting side 38 is provided as a hinge along the rear portion of the mounting plate 18. The hinge 38 allows the mounting plate 18 to pivot as shown by arrow 50 in FIG. 4 between a retracted position (e.g. a vertical position) and an extended position (e.g. a horizontal position as shown in FIG. 3). Thus, the mounting plate 18 serves as a pivoting foot on the lower portion of the cart 10.

The mounting plate 18 further includes an upper surface 34 and a lower surface 36. The lower surface 36 of the mounting plate 18 is configured to rest upon the upper surface 30 of the base plate 16 when the mounting plate 18 is in the extended position. The lower surface 36 of the mounting plate 18 faces forward on the cart 10 when the mounting plate 18 is in the retracted position. Similarly, the upper surface 34 of the mounting plate 18 faces upward on the cart when the mounting plate is in the extended position and faces rearward on the cart when the mounting plate is in the retracted position.

A mounting member 42 in the form of a post is fixed on the upper face 34 of the mounting plate 18 near the apex 40. The mounting member 42 is oriented such that it is substantially perpendicular to the mounting plate 18. In particular, as shown in FIG. 3, a central axis X defined by the post 42 is substantially perpendicular to a plane P defined by the upper face 34 of the mounting plate 18. In at least one embodiment, the mounting member 42 is a metal tube less than twelve inches in length, and preferably about six inches in length.

A mounting member retaining structure is provided on the frame 12 in the form of a clip 44. The clip 44 is positioned on a vertical clip plate 46 extending upward from the rear of the base plate 16. The clip 44 includes two opposing spring arms 48 configured to receive the post 42 therebetween. In particular, when the post 42 is forced against the spring arms 48, the spring arms separate enough to receive the post 42, and then spring back to shape, collapsing around the post 42 and holding the post 42 in place on the clip. With the post 42 held in the clip 44, the mounting plate is retained upright on the frame 12 in the retracted position. In this retracted or stowed position, the mounting plate 18 is held firmly out of the way of an object supported on the base plate 16 by mechanical interaction of the mounting tube 42 and the clip 44.

Figure 5:
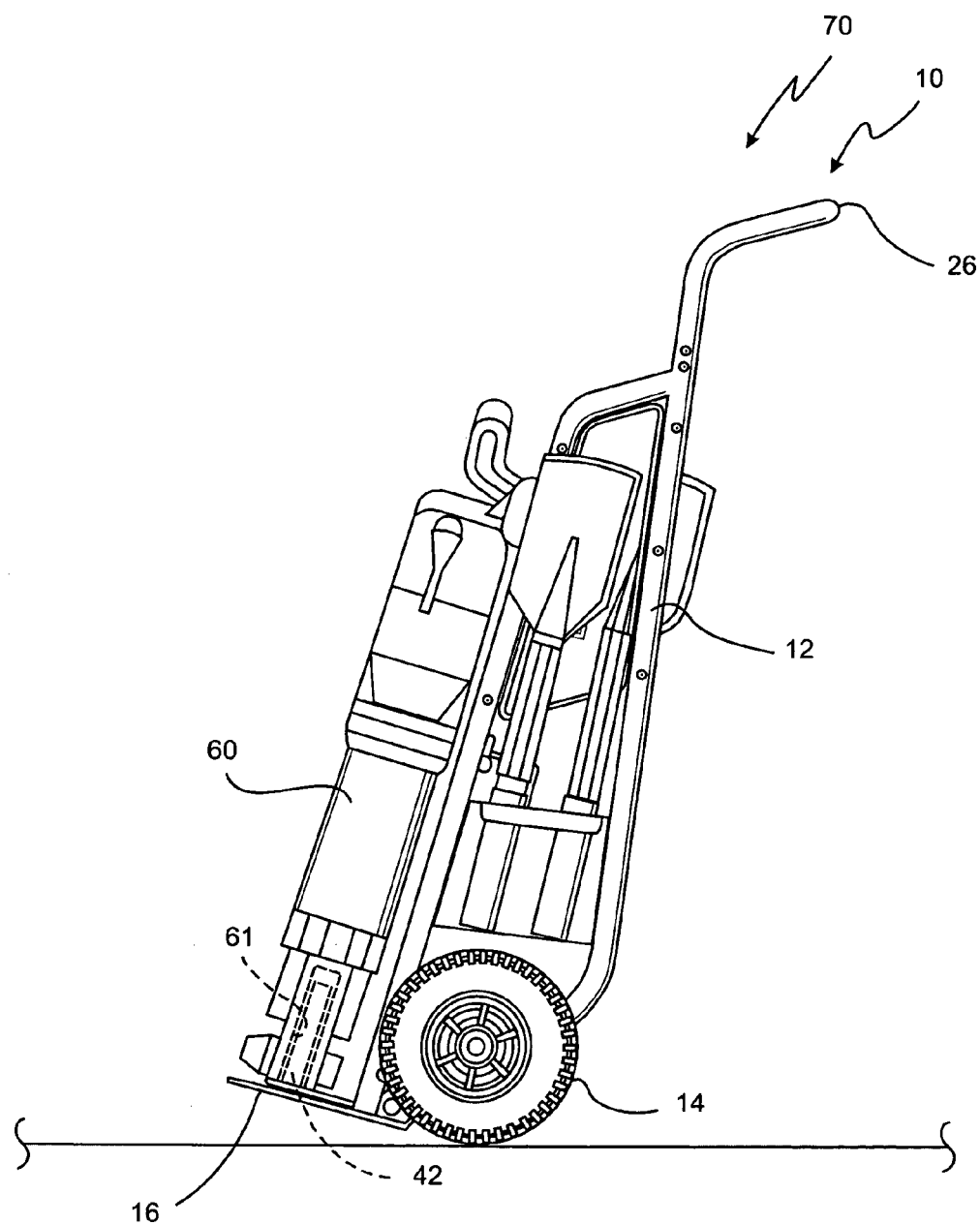
FIG. 5 shows a side view of the hand truck of FIG. 1 with a hammer drill supported thereon to form a hand truck assembly.

In operation, the hand truck 10 may be used in a first mode with the mounting plate 18 in the extended position and in a second mode with the mounting plate 18 in the retracted position. When the mounting plate 18 is in the extended position, as shown in FIGS. 1-3, the mounting plate 18 extends substantially over the base plate 16 and rests upon the base plate 16. With the mounting plate in this position, the post 42 extends upward and substantially perpendicular to the base plate 16. With the mounting plate in this extended position, a power tool such as a hammer jack 60 may be placed over the post, helping to secure the hammer jack on the cart 10, as shown in FIG. 5. In particular, the hammer jack 60 defines a cavity 61 in a distal or lower portion of thereof. The post 42 is configured to be received in the cavity 61 of the hammer jack 60 as shown in FIG. 5. Note that the hand truck 10 and the hammer jack 60 form an assembly 70. If a user then grasps the handle 26 and tips the cart 10 onto its wheels 14, the cart may be used to move the hammer jack, with the mounting plate 18 and post 42 helping to secure the hammer jack on the cart 10. It will be recognized that other types of equipment other than a hammer jack 60 may be utilized with the mounting plate 18 in this position. In particular, any equipment or apparatus with a central cavity or other structure configured to accept the post 42 may be advantageously secured to the cart 10 with the mounting plate 18 in the extended position.

Figure 4:
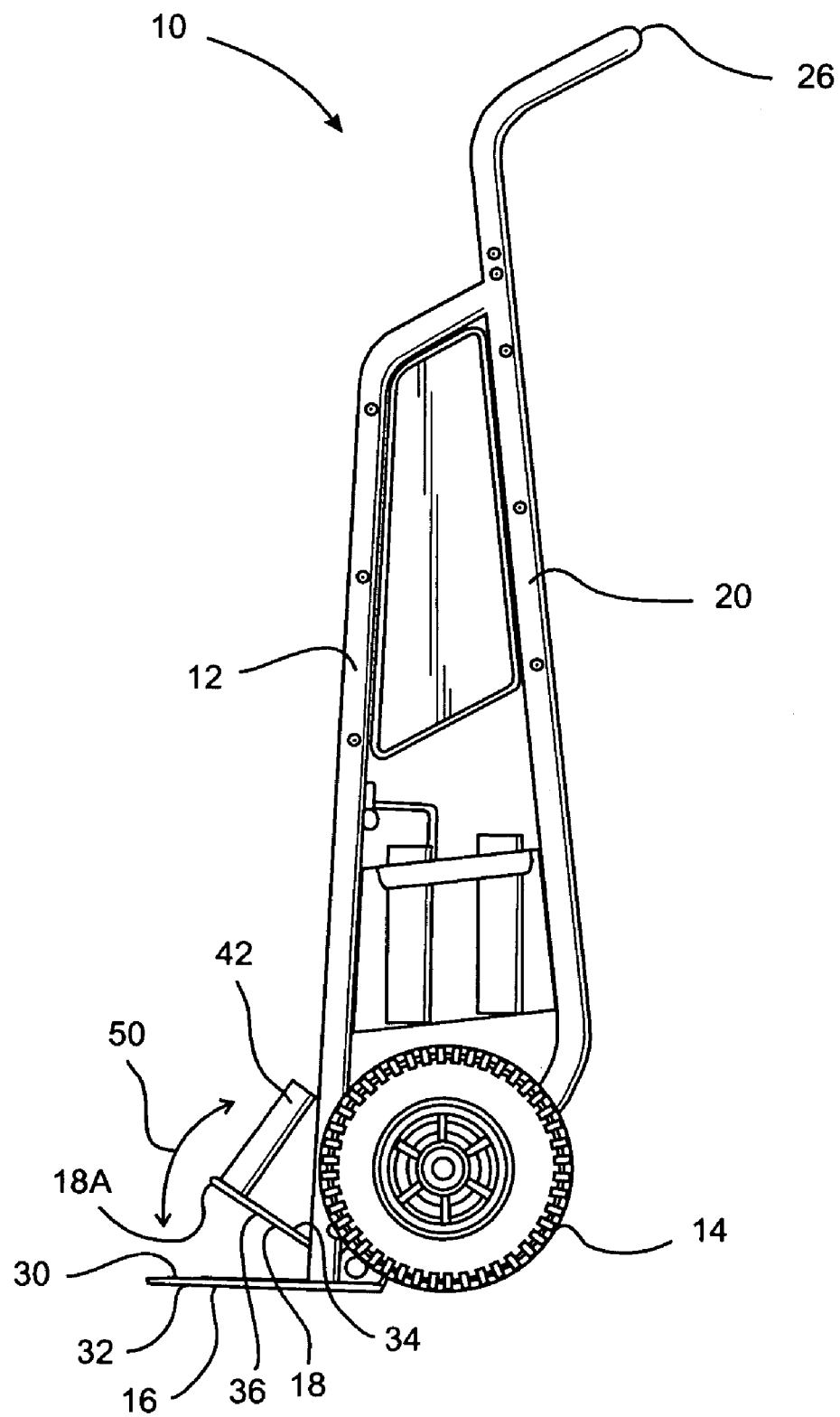
FIG. 4 shows a side view of the hand truck of FIG. 3 with the mounting plate pivoting between the extended position and a retracted position.

If a piece of equipment or other apparatus needs to be moved with the cart 10 but that the post 42 would be in the way of engaging the apparatus with the base plate 16, the mounting plate 18 may be advantageously pivoted away from the base plate 16, as shown in FIG. 4. In the retracted or stowed position, the post 42 does not interfere with the contact between the apparatus to be moved and the base plate 16. With the mounting plate 18 in this retracted position, the cart 10 may be advantageously used as a standard hand truck with no obstructions provided near the base plate 10. Accordingly, the hand truck with retractable mounting plate disclosed herein provides a cart 10 that may be used in a first mode to move specialized types of equipment such as the hammer jack 60, and a second mode where the cart operates as a standard hand truck to move boxes and other items.

Figure 6:
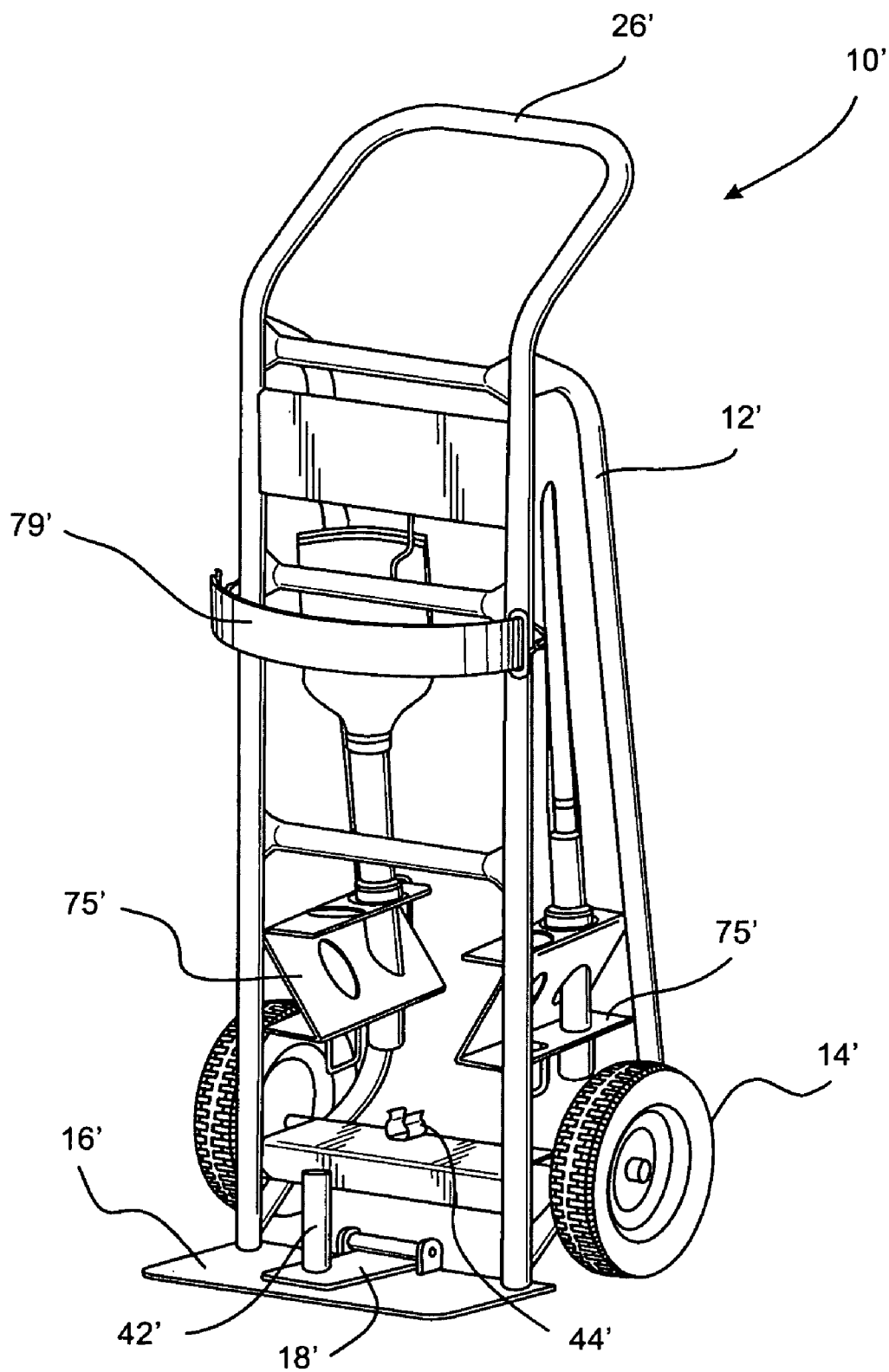
FIG. 6 shows a perspective view of another embodiment of a hand truck with a retractable mounting plate.
Figure 7:
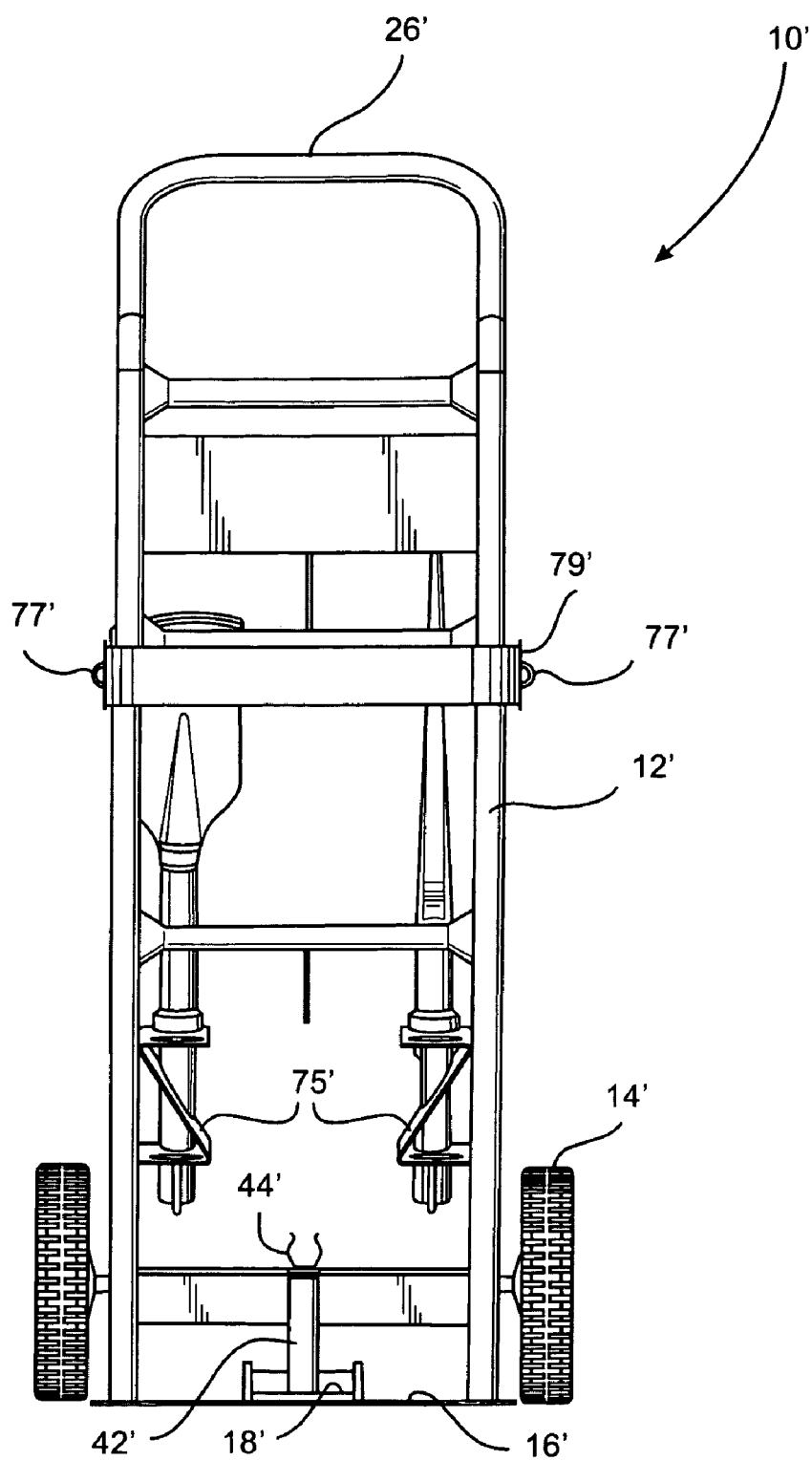
FIG. 7 shows a front view of the hand truck of FIG. 6.

Turning now to FIGS. 6 and 7, there is shown another embodiment of a hand truck 10' of the present disclosure. The hand truck 10' has many similarities to the hand truck 10 of FIGS. 1-5, and thus, like reference numbers will be used to correspond to like components with only a prime symbol (') distinguishing the two groups of reference numbers of the two embodiments. For example, the hand truck 10' includes an upright frame 12', two wheels 14', a fixed work support member or base plate 16' and a movable work support member or pivotable mounting plate 18'. A mounting member 42' in the form of a post is fixed on an upper face of the mounting plate 18' as shown in FIG. 6.

One distinction between the hand truck 10' (FIGS. 6-7) and the hand truck 10 (FIGS. 1-5) is that the pivotal mounting plate 18' is generally rectangular and substantially narrower in comparison to the pivotal mounting plate 18. Another distinction between the hand trucks of the two embodiments is that the implement holders 75' of the hand truck 10' possess a Z-shape, while the implement holders of the hand truck 10 include a number of tubes. Yet another distinction is that the hand truck 10' includes a pair of eyelets 77' attached to the frame 12' which allow a belt 79' to be readily attached to the hand truck 10'. Other distinctions between the two embodiments of the hand trucks 10, 10' can be quickly understood from a review of the FIGS. 1-7.

While the invention has been described with reference to exemplary embodiments, it will be understood by those skilled in the art that other implementations and adaptations are possible. For example, various changes may be made and equivalent elements may be substituted for elements thereof without departing from the scope of the invention. In addition, many modifications may be made to adapt a particular situation or material to the teachings of the invention without departing from the essential scope thereof. Also, there are advantages to individual advancements described herein that may be obtained without incorporating other aspects described herein. Therefore, it is intended that the invention not be limited to the particular embodiment disclosed for carrying out this invention, but that the invention will include all embodiments falling within the scope of the claims.

Any use herein of the terms first, second, third, etc., does not denote any order or importance, but rather the terms first, second, third, etc. are used to distinguish one element from another. Further, use of the terms "a," "an," etc. does not denote a limitation of quantity, but rather denotes the presence of at least one of the referenced item. In addition, use of the terms "including" or "comprising" are meant to be inclusive and without limitation to additional elements or other related recitations.

What is claimed is:

1. A hand truck assembly, comprising:
a frame including an upper portion and a lower portion;
a handle attached to said upper portion of said frame;
at least one wheel attached to said lower portion of said frame;
a fixed work support member attached in fixed relation to said lower portion of said frame;
a movable work support member attached to said lower portion of said frame, said movable work support member being moveable between (i) a first position in which a free end portion of said movable work support member rests on said fixed work support member, and (ii) a second position in which said free end portion of said movable work support member is spaced apart from said fixed work support member;
a post attached in fixed relation to said free end portion of said movable work support member, wherein, when said movable work support member is positioned in said first position, said fixed work support member is located under said post; and
a retainer attached to said lower portion of said frame, wherein (i) said retainer cooperates with said post to retain said movable work support member in said second position, and (ii) said post is spaced apart from said retainer when said movable work support member is positioned in said first position,
wherein said retainer includes a clip having a pair of spring arms attached to said lower portion of said frame, and
wherein said post is received between said pair of spring arms when said movable work support member is positioned in said second position.

2. The hand truck assembly of claim 1, further comprising a power tool defining a cavity, wherein:
when said movable work support member is positioned in said first position, (i) said post is located within said cavity of said power tool, and (ii) said power tool rests on said movable work support member.

3. The hand truck assembly of claim 2, wherein:
said power tool includes a hammer jack having a proximal portion and a distal portion, and
said distal portion of said hammer jack defines said cavity.

4. The hand truck assembly of claim 1, wherein said movable support member is configured to pivot between said first position and said second position.

5. The hand truck assembly of claim 1, wherein:
said post defines an axis,
said movable work support member defines a plane, and
said axis is oriented to be perpendicular to said plane.

6. The hand truck assembly of claim 1, wherein:
said fixed work support member includes a first plate defining an upper surface,
said movable work support member includes a second plate defining a lower surface,
said lower surface is positioned in contact with said upper surface when said movable work support member is positioned in said first position, and
said lower surface is spaced apart from said upper surface when said movable work support member is positioned in said second position.

7. A hand truck assembly, comprising:
a frame including an upper portion and a lower portion;
a pair of wheels supported by said frame;
a fixed work support member attached in fixed relation to said lower portion of said frame;
a movable work support member attached to said lower portion of said frame, said movable work support member being moveable between (i) a first position in which a free end portion of said movable work support member contacts said fixed work support member, and (ii) a second position in which said free end portion of said movable work support member is spaced apart from said fixed work support member;
a mounting member attached to said free end portion of said movable work support member, wherein, when said movable work support member is positioned in said first position, said fixed work support member is located under said mounting member; and
a retainer attached to said lower portion of said frame, wherein (i) said retainer cooperates with said mounting member to retain said movable work support member in said second position, and (ii) said mounting member is spaced apart from said retainer when said movable work support member is positioned in said first position, wherein said retainer includes a clip having a pair of spring arms attached to said lower portion of said frame, and wherein said said mounting member is received between said pair of spring arms when said movable work support member is positioned in said second position.

8. The hand truck assembly of claim 7, further comprising a power tool defining a cavity, wherein:

when said movable work support member is positioned in said first position, (i) said mounting member is located within said cavity of said power tool, and (ii) said power tool contacts said movable work support member.

9. The hand truck assembly of claim 8, wherein:

said power tool includes a hammer jack having a proximal portion and a distal portion, and said distal portion of said hammer jack defines said cavity.

10. The hand truck assembly of claim 7, wherein said movable support member is configured to pivot between said first position and said second position.

11. The hand truck assembly of claim 7, wherein:

said mounting member includes a post that defines an axis, said movable work support member defines a plane, and said axis is oriented perpendicular to said plane.

12. The hand truck assembly of claim 7, wherein:

said fixed work support member includes a first plate defining an upper surface, said movable work support member includes a second plate defining a lower surface, said lower surface is positioned in contact with said upper surface when said movable work support member is positioned in said first position, and said lower surface is spaced apart from said upper surface when said movable work support member is positioned in said second position.

13. The hand truck assembly of claim 1, wherein:

said movable work support member includes an upper face, said post includes (i) a lower post end fixed to said upper face of said movable work support member, (ii) an upper free post end, and (iii) a post body extending therebetween, and said post extends outwardly from said upper face of said movable work support member.

14. The hand truck assembly of claim 13, wherein:

said upper face of said movable work support member is configured to be substantially planar, and said post extends from said upper face of said movable work support member in a substantially perpendicular manner.

15. The hand truck assembly of claim 1, wherein, when said movable work support member is positioned in said first position, said movable work support member is interposed between said post and said fixed work support member.

16. The hand truck assembly of claim 1, wherein:

said post defines a central axis, and when said movable work support member is positioned in said first position, said central axis intersects said fixed work support member.

17. The hand truck assembly of claim 7, wherein:

said movable work support member includes an upper face, said mounting member includes (i) a lower end fixed to said upper face of said movable work support member, (ii) an upper end, and (iii) an elongated body extending therebetween, and said mounting member extends outwardly from said upper face of said movable work support member.

18. The hand truck assembly of claim 17, wherein:

said upper face of said movable work support member is configured to be substantially planar, and said mounting member extends from said upper face of said movable work support member in a substantially perpendicular manner.

19. The hand truck assembly of claim 7, wherein, when said movable work support member is positioned in said first position, said movable work support member is interposed between said mounting member and said fixed work support member.

20. The hand truck assembly of claim 7, wherein:

said mounting member defines a central axis, and when said movable work support member is positioned in said first position, said central axis intersects said fixed work support member.

* * * * *